US008535488B2

(12) United States Patent
Choi et al.

(10) Patent No.: US 8,535,488 B2
(45) Date of Patent: Sep. 17, 2013

(54) METHOD AND APPARATUS FOR PURIFICATION OF TRICHLOROSILANE

(75) Inventors: Chul-Hwan Choi, Daejeon (KR);
Jeong-Seok Lee, Daejeon (KR);
Kwang-Wook Choi, Daejeon (KR);
Joon-Ho Shin, Daejeon (KR);
Dong-Kyu Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/324,869

(22) Filed: Dec. 13, 2011

(65) Prior Publication Data

US 2012/0145530 A1    Jun. 14, 2012

Related U.S. Application Data

(63) Continuation of application No. PCT/KR2010/009374, filed on Dec. 27, 2010.

(30) Foreign Application Priority Data

Dec. 28, 2009 (KR) .................. 10-2009-0131919

(51) Int. Cl.
*B01D 3/00* (2006.01)
*C01B 33/107* (2006.01)

(52) U.S. Cl.
USPC ............... 203/74; 203/77; 203/80; 423/342; 423/347; 423/349

(58) Field of Classification Search
USPC .............. 203/2, 74, 77, 80; 423/342, 347, 423/349
See application file for complete search history.

(56) References Cited

U.S. PATENT DOCUMENTS

| 2,563,557 | A | * | 8/1951 | Schubert et al. ................ 203/71 |
| 4,217,178 | A | * | 8/1980 | Katzen et al. ................... 203/19 |
| 4,340,574 | A | * | 7/1982 | Coleman ...................... 423/347 |
| 4,422,903 | A | * | 12/1983 | Messick et al. ................. 203/19 |
| 4,539,076 | A | * | 9/1985 | Swain .......................... 202/154 |
| 4,743,344 | A | * | 5/1988 | Breneman et al. .............. 203/81 |
| 5,035,776 | A | * | 7/1991 | Knapp ........................... 203/19 |
| 5,232,602 | A |   | 8/1993 | Brink et al. |
| 6,171,449 | B1 |   | 1/2001 | Welch |
| 6,905,576 | B1 | * | 6/2005 | Block et al. .................... 203/29 |
| 7,879,198 | B2 | * | 2/2011 | Ghetti ........................... 203/29 |

(Continued)

FOREIGN PATENT DOCUMENTS

| CN | 1693192 | 11/2005 |
| GB | 1563512 | 3/1980 |
| JP | S52-062958 | 5/1977 |
| JP | 2004-149351 A | 5/2004 |

(Continued)

*Primary Examiner* — Virginia Manoharan
(74) *Attorney, Agent, or Firm* — McKenna, Long and Aldridge, LLP.

(57) ABSTRACT

There is provided a method for a purification of trichlorosilane, the method including: performing a pretreatment for separating a chlorosilane mixture from reaction products of a trichlorosilane production reaction; performing a first purification for separating the chlorosilane mixture into a first top stream and a first bottom stream; performing a second purification for separating the first top stream into a second top stream and a second bottom stream; and performing a third purification for separating the second bottom stream into a third top stream and a third bottom stream, wherein the performing of the third purification is carried out under pressure conditions higher than those of the performing of the second purification, and a heat exchange is generated between the second bottom stream and the third top stream.

4 Claims, 3 Drawing Sheets

(56) References Cited

U.S. PATENT DOCUMENTS

| | | |
|---|---|---|
| 8,197,646 B2 * | 6/2012 | Schmidtke et al. .............. 203/75 |
| 8,197,783 B2 | 6/2012 | Masuda et al. |
| 8,246,925 B2 | 8/2012 | Schwarz et al. |
| 8,282,792 B2 | 10/2012 | Ghetti |
| 2004/0028594 A1 | 2/2004 | Klein et al. |
| 2009/0060819 A1 | 3/2009 | Bill, Jr. et al. |
| 2009/0142246 A1 | 6/2009 | Masuda et al. |

FOREIGN PATENT DOCUMENTS

| | | |
|---|---|---|
| JP | 2007-001791 A | 1/2007 |
| JP | 2008-520535 | 6/2008 |
| JP | 2009-149502 | 7/2009 |
| JP | 2010-521409 | 6/2010 |
| KR | 10-0442501 B1 | 7/2004 |
| KR | 10-2007-0086356 A | 8/2007 |
| KR | 10-2009-0056849 A | 6/2009 |
| WO | WO 2006/054325 A2 | 5/2006 |

* cited by examiner

METHOD AND APPARATUS FOR PURIFICATION OF TRICHLOROSILANE

CROSS-REFERENCE TO RELATED APPLICATIONS

This application claims the priorities of Korean Patent Application No. 10-2009-0131919 filed on Dec. 28, 2009, in the Korean Intellectual Property Office and the international application No. PCT/KR2010/009374 filed on Dec. 27, 2010, the disclosure of which is incorporated herein by reference.

BACKGROUND OF THE INVENTION

1. Field of the Invention

The present invention relates to a method and an apparatus for the purification of chlorosilane, a raw material of high purity polysilicon, and more particularly, to a method and an apparatus for the purification of chlorosilane, which are economical and have low energy consumption, as compared to the related art.

2. Description of the Related Art

In general, polysilicon, used as a raw material of a semiconductor or a solar battery, has been mainly manufactured by a vapor deposition method referred to as the Siemens method. In FIG. 1, a process of manufacturing polysilicon by the Siemens method according to the related art is schematically illustrated.

The process of manufacturing polysilicon may largely include an operation of fabricating trichlorosilane, a raw material thereof, an operation of purifying trichlorosilane to have a high level of purity, and an operation of reacting the purified trichlorosilane with hydrogen to generate polysilicon.

Referring to FIG. 1, the process of manufacturing polysilicon is explained in detail. First, metallic silicon 21, a raw material of polysilicon, and hydrochloric acid gas 22 are supplied to a reactor 101 and reacted with each other at a reaction temperature of 300 to 400° C., to thereby fabricate trichlorosilane. In this case, reaction products of the reaction of the metallic silicon and the hydrochloric acid gas may include hydrogen gas, unreacted hydrochloric acid gas, chlorosilanes, such as tetrachlorosilane, dichlorosilane, and the like mixed therein, as well as trichlorosilane, a target product.

Thus, the purification process for separating trichlorosilane, a target product, from the reaction products, may be performed. In general, in order to form high purity polysilicon, trichlorosilane having a purity of 99.9999999% to 99.999999999% is required. In order to obtain such a high purity trichlorosilane, the purification process may be generally undertaken through a plurality of purification towers. The purification process of trichlorosilane is hereinafter explained in detail.

First, in a pretreatment tower 102, a chlorosilane mixture is separated from the reaction products discharged from the reactor 101 through distillation. In this case, among the reaction products, hydrogen gas, hydrochloric acid gas, dichlorosilane, and the like, having a low boiling point, are discharged through a top stream 41 of the pretreatment tower 102, while the chlorosilane mixture including trichlorosilane and tetrachlorosilane, having a high boiling point, as main ingredients, is discharged through a bottom stream 42 of the pretreatment tower 102.

The bottom stream 42 of the pretreatment tower 102 is introduced to a first purification tower 103, and the chlorosilane mixture is separated into trichlorosilane and tetrachlorosilane through distillation in the first purification tower 103. In the chlorosilane mixture, trichlorosilane having a relatively low boiling point is discharged through a top stream 43, while tetrachlorosilane having a relatively high boiling point is discharged through a bottom stream 44. In this case, trichlorosilane discharged through the top stream 43 of the first purification tower 103 may generally have a purity of approximately 99%. However, as described above, since trichlorosilane having purity of 99.9999999% to 99.999999999% is generally required to produce high purity trichlorosilane, the top stream 43 of the first purification tower 103 is introduced to a second purification tower 104 and re-purified therein.

The trichlorosilane introduced to the second purification tower 104 is separated into a mixture of low-boiling point impurities and trichlorosilane, and a mixture of high-boiling impurities, such as tetrachlorosilane and trichlorosilane. The mixture of low-boiling impurities and trichlorosilane is discharged through a top stream 45 and passes through a condenser 201 to be liquefied. A portion of the liquefied mixture reflows to the second purification tower 104 and the remainder thereof 47 is discharged. Meanwhile, the mixture of high-boiling point impurities and trichlorosilane is discharged through a bottom stream 48, and then re-heated through a reboiler 301 in the second purification tower 104. Then, a portion 49 of the re-heated mixture is recycled to the second purification tower 104, and the remainder thereof 50 is introduced to a third purification tower 105 to be purified again. In the third purification tower 105, the mixture of high-boiling point impurities and trichlorosilane is separated into high purity trichlorosilane and trichlorosilane including high-boiling point impurities. In this case, high purity trichlorosilane is discharged through a top stream 51, and liquefied in a condenser 202. Then, a portion 52 of the liquefied trichlorosilane reflows to the third purification tower 105, and the remainder 53 thereof is discharged to a storage tank 1 for trichlorosilane. Meanwhile, trichlorosilane including high-boiling point impurities is discharged through a bottom stream 54 and re-heated through a reboiler 302. Then, a portion 55 of the re-heated trichlorosilane is recycled to the third purification tower, and the remainder 56 thereof is discharged. FIG. 1 illustrates a purification operation reaching only to a third purification tower; however, further purification steps may be performed as needed.

Through such an operation, trichlorosilane stored in the storage tank 1 for trichlorosilane is supplied to a reducing furnace 106 in which polysilicon is generated, as a raw material, together with hydrogen gas 2.

In the case of the method of manufacturing polysilicon according to the related art, in order to obtain high purity trichlorosilane, passing trichlorosilane through a plurality of purification towers is required, and the inclusion of a condenser cooling a top stream and a reboiler re-heating a bottom stream for each purification tower is required. Due to these requirements, the amount of utilities required is increased, and production costs and energy consumption are increased, in a manufacturing process.

Therefore, a method of purifying trichlorosilane, capable of reducing energy consumption used in the purification operation of trichlorosilane and curtailing production costs, in consideration of environmental and economical aspects, has been demanded.

SUMMARY OF THE INVENTION

An aspect of the present invention provides an economical and eco-friendly method for the purification of trichlorosilane by minimizing the use of utilities employed in a condenser and a reboiler and reducing energy consumption.

According to an aspect of the present invention, there is provided a method for a purification of trichlorosilane, the method including: performing a pretreatment for separating a chlorosilane mixture including trichlorosilane and tetrachlorosilane as a main ingredient from reaction products of a trichlorosilane production reaction; performing a first purification for separating the chlorosilane mixture into a first top stream including a mixture of trace impurities and trichlorosilane, and a first bottom stream including tetrachlorosilane as a main ingredient; performing a second purification for separating the first top stream into a second top stream including a mixture of trace impurities having a low boiling point and trichlorosilane, and a second bottom stream including a mixture of trace impurities having a high boiling point and trichlorosilane; and performing a third purification for separating the second bottom stream into a third top stream including trichlorosilane as a main ingredient, and a third bottom stream including a mixture of trace impurities having a high boiling point and trichlorosilane, wherein the performing of the third purification is carried out under pressure conditions higher than those of the performing of the second purification, and a heat exchange is generated between the second bottom stream and the third top stream.

In this case, the performing of the third purification may be carried out under pressure conditions higher than those of the performing of the second purification by 0.5 to 100 atm. The performing of the second purification may be carried out under pressure conditions of 1 to 10 atm, and the performing of the third purification may be carried out under pressure conditions of 1.5 to 100 atm.

In addition, the second bottom stream and the third top stream may have a temperature difference of 5 to 200° C. The bottom stream of the performing of the second purification may have a temperature of 40 to 120° C., and the top stream of the performing of the third purification may have a temperature of 60 to 250° C.

According to another of the present invention, there is provided an apparatus for a purification of trichlorosilane, the apparatus including a pretreatment tower, a first purification tower, a second purification tower, and a third purification tower, wherein the third purification tower has an internal pressure maintained to be higher than that of the second purification tower, and the apparatus includes a heat exchanger for performing a heat exchange between a top stream of the third purification tower and a bottom stream of the second purification tower.

In this case, the third purification tower may have an internal pressure maintained to be higher than an internal pressure of the second purification tower by 0.5 to 100 atm. The second purification tower may have an internal pressure of 1 to 10 atm, and the third purification tower may have an internal pressure of 1.5 to 100 atm.

Meanwhile, the top stream of the third purification tower and the bottom stream of the second purification tower may have a temperature difference of 5 to 200° C. The top stream of the third purification tower may have a temperature of 60 to 250° C., and the bottom stream of the second purification tower may have a temperature of 40 to 120° C.

BRIEF DESCRIPTION OF THE DRAWINGS

The above and other aspects, features and other advantages of the present invention will be more clearly understood from the following detailed description taken in conjunction with the accompanying drawings, in which.

DESCRIPTIONS WITH REGARD TO REFERENCE NUMERALS

Figure 1:
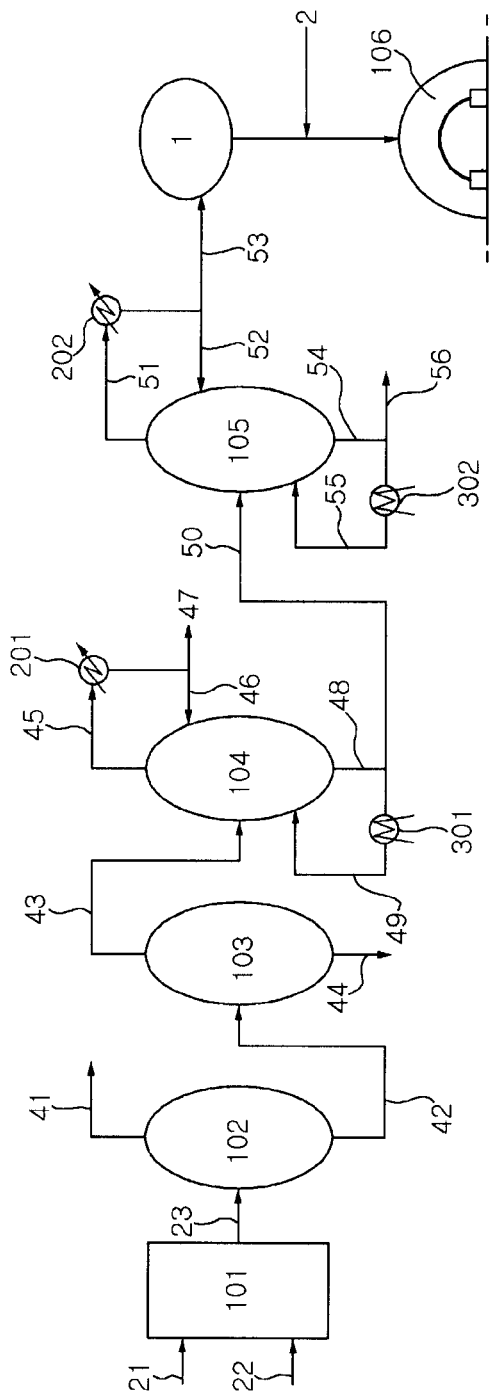
FIG. 1 is a diagram describing a process of manufacturing polysilicon according to the related art.

101: Reactor
102: Pretreatment tower
103: First purification tower
104: Second purification tower
105: Third purification tower
201, 202: Condensers
301, 302: Reboilers
401: Heat exchanger

DETAILED DESCRIPTION OF THE INVENTION

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and sizes of components are exaggerated for clarity. The same or equivalent elements are referred to by the same reference numerals throughout the specification.

As a result of repeatedly undertaking research into developing a method for the purification of trichlorosilane, a method having low energy consumption and being economical and eco-friendly, the inventors found that, in a trichlorosilane purification process, the use of utilities employed in a condenser or a reboiler may be minimized and energy consumption may be significantly reduced by controlling pressure in a specific purification step, and completed the present invention.

Figure 2:
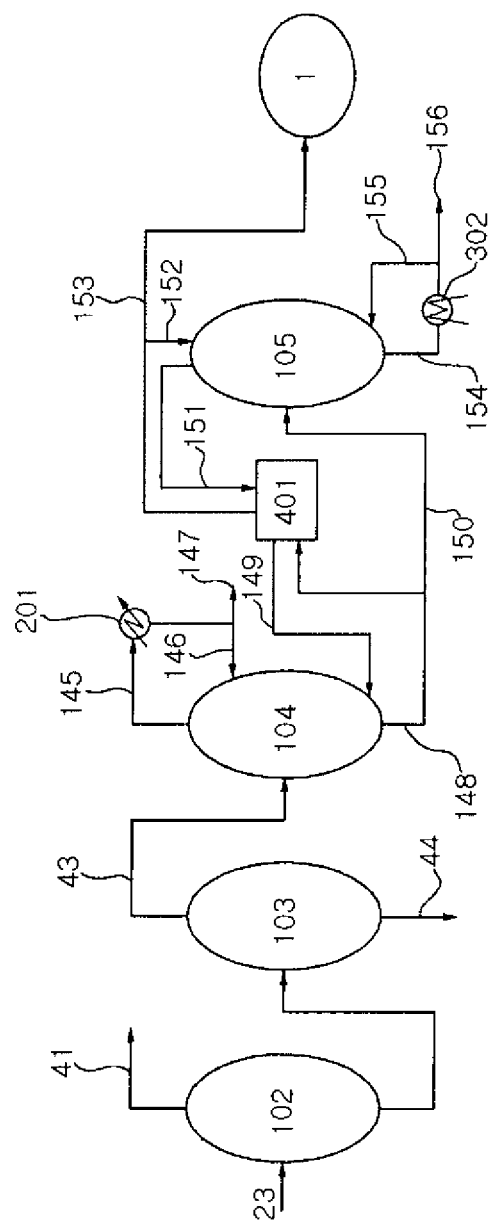
FIG. 2 is a diagram describing a method for the purification of trichlorosilane according to an embodiment of the present invention.

FIG. 2 is a diagram describing a method and an apparatus for the purification of trichlorosilane according to an embodiment of the present invention. Hereinafter, referring to FIG. 2, the method and the apparatus for the purification of trichlorosilane according to an embodiment will be explained in detail.

First, the apparatus for the purification of trichlorosilane will be explained.

As illustrated in FIG. 2, the apparatus for the purification may include a pretreatment tower 102, a first purification tower 103, a second purification tower 104, and a third purification tower 105, and reaction products generated in a reactor (not shown) are purified to have high purity, while sequentially passing through these towers. The actions of the pretreatment tower 102, the first purification tower 103, the second purification tower 104, and the third purification tower 105, and trichlorosilane purification processes carried out in the respective purification towers are similar to those described in the Background Art.

However, in the case of an apparatus for a purification of trichlorosilane according to the related art, the purification towers are operated under the same pressure conditions. On the other hand, in the apparatus for the purification according to an embodiment of the present invention, an internal pressure of the third purification tower is maintained to be higher than that of the second purification tower.

In addition, in the case of the apparatus for the purification according to the related art, each of the second purification tower and the third purification tower needs to include a condenser and a reboiler. On the other hand, the apparatus for the purification according to an embodiment of the present invention neither includes a reboiler for heating a bottom stream of the second purification tower nor a condenser for cooling a top stream of the third purification tower. Instead, the apparatus for the purification according to an embodiment of the present invention includes a heat exchanger 401 for performing a heat exchange between the top stream of the third purification tower and the bottom stream of the second purification tower.

The reason for which the internal pressure of the third purification tower is maintained to be higher than that of the second purification tower is due to the fact that a temperature difference between the stream of the second purification tower and the stream of the third purification tower is caused thereby through the pressure difference, and a smooth heat exchange may be generated through the temperature difference. This will be explained in detail as follows.

In the case of the apparatus for the purification of trichlorosilane according to the related art, as shown in FIG. 1, the respective second purification tower 104 and third purification tower 105 may include condensers 201 and 202, and reboilers 301 and 302. The condensers 201 and 202 may cool and condense top streams discharged from the respective second and third purification towers 104 and 105, such that portions 46 and 52 of the top streams may reflow into the respective second and third purification towers and the remainders 47 and 53 thereof may be discharged. The reboilers 301 and 302 may heat bottom streams of the respective second and third purification towers, such that portions 49 and 55 of the bottom streams may be recycled into the respective second and third purification towers and the remainders 50 and 56 thereof may be discharged. In this manner, cooling or heating the top streams and the bottom streams discharged from the purification towers and recycling portions thereof into the purification towers may be necessarily required in order to maintain a constant temperature in the respective purification towers. However, as the number of the purification towers is increased, the number of utilities required to be included, such as condensers and reboilers may be increased and energy consumption in these utilities may also be increased. As a result, production costs may be increased.

Thus, in order to solve such defects, the inventors intended to minimize the use of utilities and reduce energy consumption by including the heat exchanger 401 for performing a heat exchange between the top stream of the third purification tower and the bottom stream of the second purification tower.

However, in the case of the apparatus for the purification of trichlorosilane according to the related art, a temperature difference between the top stream of the third purification tower and the bottom stream of the second purification tower rarely exists, or the top stream of the third purification tower has a temperature lower than that of the bottom stream of the second purification tower. Thus, even in the case of installing the heat exchanger, a smooth heat exchange between the top stream of the third purification tower and the bottom stream of the second purification tower may not be implemented. This is because 99% or more of purifying targets in both of the second and third purification towers are trichlorosilane, while impurities of approximately 1% are merely mixed with the purifying targets, whereby boiling points between the third purification tower and the second purification tower may not be significantly different.

Accordingly, in order to implement a smooth heat exchange, the generation of a temperature difference between the top stream of the third purification tower and the bottom stream of the second purification tower may be required. Thus, the present invention includes the heat exchanger and at the same time, allows pressure of the third purification tower to be maintained to be higher than that of the second purification tower, whereby the boiling point of trichlorosilane in the third purification tower may be higher than that of trichlorosilane in the second purification tower. As a result, the top stream of the third purification tower has a temperature higher than that of the bottom stream of the second purification tower, and, when the top stream of the third purification tower and the bottom stream of the second purification tower having such a temperature difference pass through the heat exchanger, a heat exchange may be generated while the top steam of the third purification tower may be cooled and the bottom stream of the second purification tower may be heated.

Meanwhile, the internal pressure of the third purification tower may be maintained to be higher than the internal pressure of the second purification tower, by approximately 0.5 to 100 atm, more preferably, approximately 1 to 50 atm, and most preferably, approximately 1 to 20 atm.

When a pressure difference between the second purification tower and the third purification tower is less than 0.5 atm, the temperature difference between the bottom stream of the second purification tower and the top stream of the third purification tower may be smaller. Consequently, the implementation of a smooth heat exchange may be difficult and a heat exchange area may be larger, thereby leading to increases in apparatus costs. When a pressure difference between the second purification tower and the third purification tower is more than 100 atm, excessive costs may be generated in increasing the pressure of the third purification tower, and operating the purification tower may be difficult. Therefore, considering both costs and heat exchange efficiency, a difference in internal pressure between the second purification tower and the third purification tower may be approximately 0.5 to 100 atm.

More concretely, the internal pressure of the second purification tower may be approximately 1 to 10 atm, and the internal pressure of the third purification tower may be approximately 1.5 to 100 atm. When the internal pressure of the second purification tower is less than 1 atm, an operating temperature thereof may be lowered and thus, a low-temperature heat exchange medium may need to be used, thereby leading to an increase in costs. When the internal pressure of the second purification tower is more than 10 atm, an operating temperature thereof may be increased more than necessary and thus, the pressure of the third purification tower may also need to be increased, thereby leading to an increase in costs.

In addition, in order to implement a smooth heat exchange, the temperature difference between the top stream of the third purification tower and the bottom stream of the second purification tower may be approximately 5° C. to 200° C. This is due to the fact that the implementation of heat exchange may be difficult when the temperature difference is less than 5° C., while extremely increased costs may be caused when the temperature difference is equal to or more than 200° C.

More concretely, the top stream of the third purification tower may have a temperature of approximately 60° C. to 250° C., and the bottom stream of the second purification tower may have a temperature of approximately 40° C. to 120° C.

In the case of using the apparatus for the purification of trichlorosilane according to an embodiment of the present invention, as mentioned above, the use of a condenser and a reboiler may be minimized, and cooling the top stream of the third purification tower and heating the bottom stream of the second purification tower may be simultaneously undertaken, without an introduction of separate, external energy.

Next, a method for a purification of trichlorosilane according to an embodiment of the present invention may be explained.

A method for the purification of trichlorosilane may include a pretreatment operation; a first purification operation; a second purification operation; and a third purification operation. In the method, the third purification operation is carried out under pressure conditions higher than those of the second purification operation, and a heat exchange may be implemented between the bottom stream generated from the second purification operation and the top stream generated from the third purification operation.

More concretely, in the method for the purification according to an embodiment of the present invention, the pretreatment operation for separating a chlorosilane mixture including trichlorosilane and tetrachlorosilane as the main ingredients from reaction products generated by a reaction for producing trichlorosilane (hereinafter referred to as a 'trichlorosilane production reaction') may be performed. Such a pretreatment operation may generally be undertaken in the pretreatment tower 102. As described above, the reaction products generated by the trichlorosilane production reaction may include hydrogen gas, hydrochloric acid gas, dichlorosilane, trichlorosilane, tetrachlorosilane, and the like. When such reaction products are distilled in the pretreatment tower 102, hydrogen gas, hydrochloric acid gas, dichlorosilane, and the like, having a low boiling point, are discharged through a top stream 41 of the pretreatment tower 102, while the chlorosilane mixture, such as trichlorosilane and tetrachlorosilane having a high boiling point, is discharged through a bottom stream 42 thereof.

The chlorosilane mixture discharged through the bottom stream 42 of the pretreatment operation may pass through the first purification operation, to be separated into a first top stream 43 including trichlorosilane as the main ingredient and a first bottom stream 44 including tetrachlorosilane as the main ingredient. Meanwhile, the chlorosilane mixture discharged through the bottom stream of the pretreatment operation may include trichlorosilane and tetrachlorosilane as the main ingredients; however, the chlorosilane mixture may include trace impurities which are mixed therein and have not been completely separated in the pretreatment tower 102, in addition to trichlorosilane and tetrachlorosilane. In this manner, when the chlorosilane mixture including the impurities mixed therein is distilled, impurities having a low boiling point and trichlorosilane are discharged through the first top stream 43, while impurities having a high boiling point and tetrachlorosilane are discharged through the first bottom stream 44. In general, the purity of trichlorosilane discharged through the first top stream 43 may be approximately 99%. That is, the first top stream may include approximately 1% of impurities, and the impurities may include the above-mentioned impurities which have not been separated in the pretreatment tower 102, a portion of tetrachlorosilane, and so on.

Next, the first top stream discharged from the first purification operation and including the mixture of trichlorosilane and trace impurities may be distilled through the second purification operation and separated into a second top stream 145 including a mixture of trace impurities having a low boiling point and trichlorosilane, and a second bottom stream 148 including a mixture of trace impurities having a high boiling point and trichlorosilane. In this case, the second top stream 145 may be discharged and then condensed by the condenser 201. Then, a potion 146 of the second top stream 145 may reflow into the second purification tower 104, and the remainder thereof 147 may be discharged. Meanwhile, the second bottom stream 148 may pass through the heat exchanger 401. Then, a portion 149 of the second bottom stream 148 may be recycled to the second purification tower 104 and the remainder 150 thereof may be discharged to the third purification operation, which will be described later.

Meanwhile, the second bottom stream 148 discharged from the second purification operation and including the mixture of trace impurities having a high boiling point and trichlorosilane may pass through the third purification operation, to be separated into a third top stream 151 including trichlorosilane as the main ingredient and a third bottom stream 154 including a mixture of trace impurities having a high boiling point and trichlorosilane. In this case, after the third top stream 151 may pass through the heat exchanger 401, a portion 152 thereof may reflow into the third purification tower 105 and the remainder 153 thereof may be discharged to a storage tank 1 for trichlorosilane. Meanwhile, after the third bottom stream 154 may be heated through the reboiler 302, a portion 155 thereof may be reflow into the third purification tower 105 and the remainder 156 thereof may be discharged.

Meanwhile, in the method for the purification of trichlorosilane according to an embodiment of the present invention, the third purification operation may be carried out under pressure conditions higher than those of second purification operation. This is to cause a temperature difference between the top stream generated from the third purification operation and the bottom stream generated from the second purification operation, to thereby allow for a smooth heat exchange therebetween. Thus, the pressure of the third purification operation may be higher than the pressure of the second purification operation, by approximately 1 to 100 atm, more preferably, approximately 1 to 50 atm, and most preferably, approximately 1 to 20 atm. More concretely, the second purification operation may be carried out under pressure conditions of approximately 1 to 10 atm, and the third purification operation may be carried out under pressure conditions of approximately 1.5 to 100 atm.

In addition, a temperature difference between the second bottom stream of the second purification operation and the third top stream of the third purification operation may be approximately 5 to 200° C. More preferably, the second bottom stream of the second purification operation may have a temperature of approximately 50 to 120° C. and the third top stream of the third purification operation may have a temperature of approximately 60 to 250° C.

Hereinafter, the present invention will be explained in detail with reference to Comparative and Inventive Examples.

COMPARATIVE EXAMPLE

Figure 3:
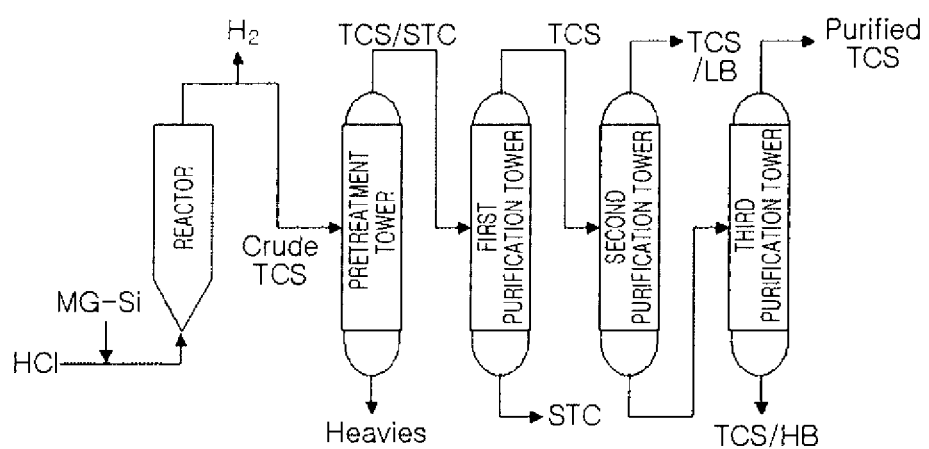
FIG. 3 is a diagram illustrating an apparatus for the purification of trichlorosilane according to Comparative and Inventive Examples.

Chlorosilane was purified through a chlorosilane purifying apparatus as illustrated in FIG. 3. In this case, operating conditions and material indexes of the chlorosilane purifying apparatus are described in the following Table 1. Here, the second purification tower and the third purification tower had the same operating pressure of 1.9 kgf/cm².

As a result of measuring the temperature of the bottom stream of the second purification tower and the temperature of the top stream of the third purification tower in the chlorosilane purifying apparatus, it was determined that the bottom stream of the second purification tower had a temperature of 54.0° C. and the top stream of the third purification tower had a temperature of 50.6° C.

TABLE 2-continued

|  |  | Comparative Example | Example 1 | Example 2 |
|---|---|---|---|---|
| Mass Fraction | TCS | 1 | 1 | 0.9997 |
|  | STC | 2.63E−13 | 4.85E−12 | 3.36E−04 |
|  | DCS | 2.41E−12 | 2.41E−12 | 2.41E−12 |
|  | DCMS | 1.16E−09 | 2.02E−09 | 2.66E−07 |
|  | BCl$_5$ | 7.18E−10 | 7.18E−10 | 7.18E−10 |
|  | PCl$_5$ | 4.71E−28 | 4.42E−26 | 3.28E−15 |
| Third bottom stream | Temperature (° C.) | 55.7 | 78.3 | 226.4 |
|  | Pressure (kg/cm²) | 2.1 | 3.9 | 50.2 |
|  | Mass Flow (kg/hr) | 42.0 | 42.0 | 42.0 |
| Mass Fraction | TCS | 0.8883 | 0.8883 | 0.9090 |
|  | STC | 0.112 | 0.112 | 0.091 |
|  | DCS | 1.18E−24 | 8.01E−23 | 2.35E−13 |
|  | DCMS | 1.67E−05 | 1.66E−05 | 3.87E−07 |
|  | BCl$_5$ | 1.69E−19 | 5.95E−18 | 5.45E−12 |
|  | PCl$_5$ | 5.12E−07 | 5.12E−07 | 5.12E−07 |

TABLE 1

| Distribution | Mass flow (kg/hr) | Temperature (° C.) | Pressure (atm) | Composition (wt %) |  |  |  |  |  |  |  |  |
|---|---|---|---|---|---|---|---|---|---|---|---|---|
|  |  |  |  | HCl | TCS | STC | DSC | DCMS | BCl$_3$ | PCl$_3$ | PSC | The others |
| C-TCS | 3579 | 25 | 4.24 | 0.2 | 86.0 | 10.0 | 0.52 | 0.00005 | 0.01 | 0.003 | 0.3 | 3.0 |
| Heavies | 368 | 128 | 3.8 |  | 0.0002 | 67.9 |  |  |  | 0.024 | 2.9 | 29.2 |
| STC | 284 | 57.1 | 1.9 |  | 63.7 | 36.3 |  | 0.0004 |  |  |  |  |
| TCS/LB | 300 | 46.4 | 1.9 | 2.4 | 91.3 |  | 6.2 |  | 0.12 |  |  |  |
| TCS/HB | 42 | 55.7 | 2.1 |  | 88.8 | 11.2 |  | 0.0017 |  | 0.00005 |  | 3.0 |
| P-TCS | 2585 | 50.8 | 1.9 |  | 100 |  |  |  |  |  |  |  |

C-TCS: Crude Trichlorosilane
STC: Silicon Tetrachloride
TCS/LB: A Mixture of Trichlorosilane and impurities having a low boiling point
TCS/HB: A Mixture of Trichlorosilane and impurities having a high boiling point
P-TCS: Purified Trichlorosilane
PSC: Polysilanechloride
DCMS: Dichloromethylsilane

Inventive Example 1

Chlorosilane was purified through the same process as that of the Comparative Example, with the exception of applying an operating pressure of 3.7 kgf/cm2 to the third purification tower.

Inventive Example 2

Chlorosilane was purified through the same process as that of the Comparative Example, with the exception of applying an operating pressure of 50 kgf/cm² to the third purification tower.

Temperatures, pressures, mass flows, and mole fractions of the third top stream (purified TCS) and the third bottom stream (TCS/HB) according to the respective Comparative Example and Inventive Examples 1 and 2 were measured. The measured results are shown in the following Table 2.

TABLE 2

|  |  | Comparative Example | Example 1 | Example 2 |
|---|---|---|---|---|
| Third purification tower pressure (kg/cm²) |  | 1.9 | 3.7 | 50.0 |
| Third top stream | Temperature (° C.) | 50.6 | 74.3 | 223.2 |
|  | Pressure (kg/cm²) | 1.9 | 3.7 | 50.0 |
|  | Mass Flow (kg/hr) | 2585.0 | 2585.0 | 2585.0 |

TABLE 2-continued

|  | Comparative Example | Example 1 | Example 2 |
|---|---|---|---|
| Reboiler duty (Gcal/hr) | 7.0E−01 | 7.0E−01 | 7.0E−01 |
| RR | 5.1 | 5.1 | 5.1 |

Comp. Ex.: Comparative Example
Inv. Ex. 1: Inventive Example 1
Inv. Ex. 2: Inventive Example 2
* Reboiler duty: Energy consumed in a reboiler
* RR: Reflux Ratio, ratio of amount discharged to product from condenser to amount refluxed into distillation tower According to Table 2, when the second purification tower and the third purification tower were operated under the same pressure conditions, similarly to the Comparative Example, the top stream of the third purification tower had a temperature of 50.6° C., lower than a temperature 54.0° C. of the second bottom stream. However, when the pressure were individually applied to the third purification tower as in Inventive Examples 1 and 2, the top stream of the third purification tower had temperatures of approximately 74.0° C. and approximately 223.0° C., respectively, and showed temperature differences of approximately 30° C. and approximately 169° C., respectively, from those of the second bottom stream. In this manner, in the case of using the third top stream of Inventive Examples 1 and 2 as a medium for heating the second bottom stream, the whole quantity of a heat source (according to simulation, it was calculated that an amount of heat of 0.25 Gal/hr is required in order to heat the second stream) for heating the second steam may be recovered.

As set forth above, in the case of using a method and an apparatus for the purification of trichlorosilane according to embodiments of the present invention, the use of utilities, such as a condenser and a reboiler may be minimized and energy consumption may be effectively reduced. As a result, costs required for manufacturing trichlorosilane may be reduced.

While the present invention has been shown and described in connection with the embodiments, it will be apparent to those skilled in the art that modifications and variations can be made without departing from the spirit and scope of the invention as defined by the appended claims.

What is claimed is:

1. A method for a purification of trichlorosilane, the method comprising:
    performing a pretreatment for separating a chlorosilane mixture including trichlorosilane and tetrachlorosilane as a main ingredient from reaction products of a trichlorosilane production reaction by distillation;
    performing a first purification for separating the chlorosilane mixture separated by the pretreatment into a first top stream including a mixture of trace impurities and trichlorosilane, and a first bottom stream including tetrachlorosilane as a main ingredient;
    performing a second purification for separating the first top stream into a second top stream including a mixture of trace impurities having a low boiling point and trichlorosilane, and a second bottom stream including a mixture of trace impurities having a high boiling point and trichlorosilane; and
    performing a third purification for separating the second bottom stream into a third top stream including trichlorosilane as a main ingredient, and a third bottom stream including a mixture of trace impurities having a high boiling point and trichlorosilane,
    wherein the performing of the third purification is carried out under pressure conditions higher than those of the performing of the second purification, and a heat exchange is generated between the second bottom stream and the third top stream, and
    wherein the second bottom stream has a temperature of 40 to 120° C., and the third top stream has a temperature of 60 to 250° C.

2. The method of claim 1, wherein the performing of the third purification is carried out under pressure conditions higher than those of the performing of the second purification by 0.5 to 100 atm.

3. The method of claim 1, wherein the performing of the second purification is carried out under pressure conditions of 1 to 10 atm, and the performing of the third purification is carried out under pressure conditions of 1.5 to 100 atm.

4. The method of claim 1, wherein the second bottom stream and the third top stream have a temperature difference of 5 to 200° C.

* * * * *